March 28, 1933.  C. SEMENITZ  1,902,907
EPISCOPIC PROJECTOR
Filed July 22, 1931

Inventor:
Christian Semenitz,
by E. F. Wurdarth
Att'y.

Patented Mar. 28, 1933

1,902,907

UNITED STATES PATENT OFFICE

CHRISTIAN SEMENITZ, OF BERLIN, CHARLOTTENBURG, GERMANY, ASSIGNOR TO REINHOLD KUPFER, OF BERLIN, GERMANY

EPISCOPIC PROJECTOR

Application filed July 22, 1931, Serial No. 552,471, and in Germany July 23, 1930.

The well-known episcopic projectors operate with diffused reflected light which by the objective lens for projector can only be collected to a small extent which causes a great loss of light. This disadvantage is obviated by the present invention in that all the light-rays received from the light source are directionally reflected by the surface of the image band and only one mirror of reflection is arranged in the course of rays between the condenser lens of the lamp and the objective.

The invention is based on the recognition of the fact that to obtain a maximum efficiency of the source of light it is necessary to reflect the light rays as far as possible in a directional manner. In the case of episcopic projection a reflecting action is necessary. This entails necessarily losses which according to the invention are, however, reduced to a minimum by causing the film to reflect substantially all the rays in a directional manner. This purpose may be served particularly by a film of rolled material the surface of which is highly polished so that no grooves at all are visible and furthermore by arranging but one mirror of reflection in the course of rays. Indeed, on account of constructional limitations it is no longer possible in projectors of comparatively large dimensions to throw the light of the source of light directly on the film and thence to reflect it in a directional manner.

It is found, for example, that it is very difficult to throw the beam of light without any loss of light on the film by way of the objective. In this connection it must be remarked that it is not possible to throw the light on to the image at an excessively large angle without affecting the quality of the image obtained. The size of the angle is comprised between 7° and 45°. The smaller the angle, the better is the image. From all this it is apparent that in the case of large projectors it is necessary to bend or kink the course of rays.

According to the invention this is effected by means of only one mirror of reflection which consequently reflects the rays also for the greater part in a directional manner.

Figure 1:
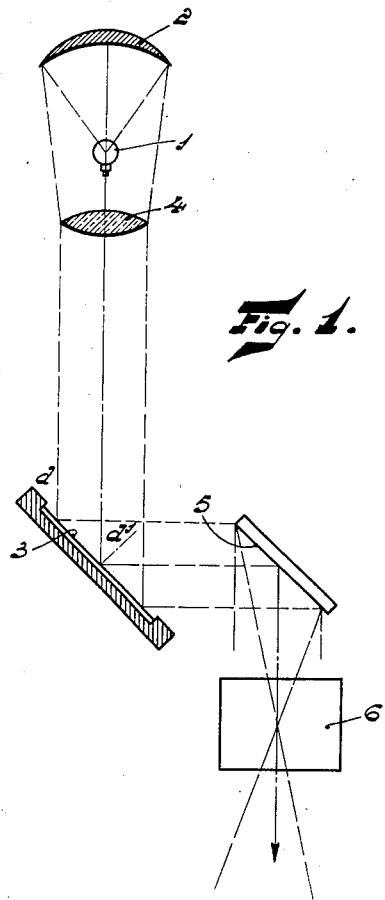
Figure 2:
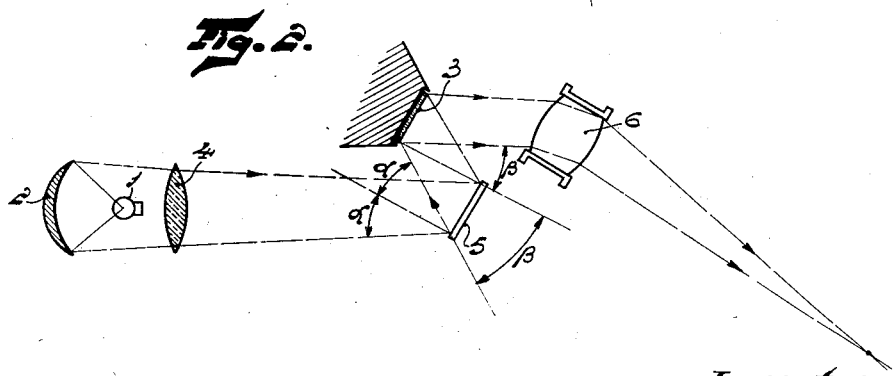

In order that the invention may be clearly understood and readily carried into effect two embodiments thereof will now be described more fully with reference to the accompanying drawing, wherein Figure 1 shows an arrangement according to the invention in which the rays reflected by the image carrier pass in the direction of the rays of illumination, whereas Figure 2 is a similar diagrammatic view of an arrangement in which the reflected rays are used for projection in their natural direction.

Referring to Figure 1, the light rays received from a lamp 1 are directed by means of a concave mirror 2 and a lens or combination of lenses 4, a condenser or the like on to an image carrier 3 arranged at an angle of inclination $a$ and are reflected by the latter at an angle of reflection $a^1$ in a directional manner so as to be thrown on to a mirror 5. As in the example shown the mirror 5 is arranged parallel to the image carrier 3, the angle of incidence and the angle of reflection of the rays reaching the mirror 5 are also $a$ and $a^1$. The mirror 5 reflects the rays received from the image carrier 3 in a directional manner without any loss of light into an objective lens for projector 6 which has a suitable focal distance and an opening ratio sufficing for the beam of rays. The mirror 5 may be replaced by another optical means having an identical or a similar effect, for example a prism. This arrangement may preferably be used in such cases in which the construction of the arrangement should lie in a direction such that the light beam of projection passes substantially parallel to the light beam received from the lamp.

Figure 2 shows an embodiment in which the rays emitted by a lamp 1 and directed in an identical manner by means of a concave mirror 2 and a combination of lenses 4, a condenser or the like, first fall at an angle $a$ on to a mirror of reflection 5 by which they are reflected at an angle of reflection $\beta$ in a directional manner on to an image band 3 and finally reach the screen after being reflected by the said band at an angle $\beta$ through an objective 6. The distortion of the picture, which distortion is introduced into the reproducing system by the inclination of the axis x—y of the objective relative to the image carrier 3, can be avoided by inserting a suitable optical means, for example a cylinder lens 7. This compensating element may be arranged within the objective 6.

As said before, as the image carrier, a film may be used which has applied to it a highly polished coating, for example a very thin iron or steel band the image carrying side of which is provided with a thin layer of aluminium applied to the band by a rolling process.

What I claim is:

1. A device for recording or reproducing pictures applied upon a non-transparent image band having a reflecting surface, comprising a source of light, a support for the image band and a mirror of reflection, said elements being so disposed that the light rays fall at an angle of less than 25° on the surface of the image band and are reflected by said image band at an angle of equal value, the reflecting surface of the image band being so highly polished that the surface acts as a mirror which reflects substantially all the rays falling on the image at the said small angle, at an angle of reflection of about the same value.

2. A device for reproducing pictures comprising a light source, a non-transparent image band having a highly polished reflecting surface and a mirror of reflection having a plane substantially parallel to the plane of said image band, said elements being so disposed relative to each other that substantially all of the light rays falling on said image have a small angle of incidence and an angle of reflection of equal value, said angles being less than 25°.

In testimony whereof I have signed my name to this specification.

CHRISTIAN SEMENITZ.